Nov. 10, 1964  H. W. ROESSLER, JR  3,156,476
PACKING FOR SWIVEL JOINTS
Filed May 18, 1960
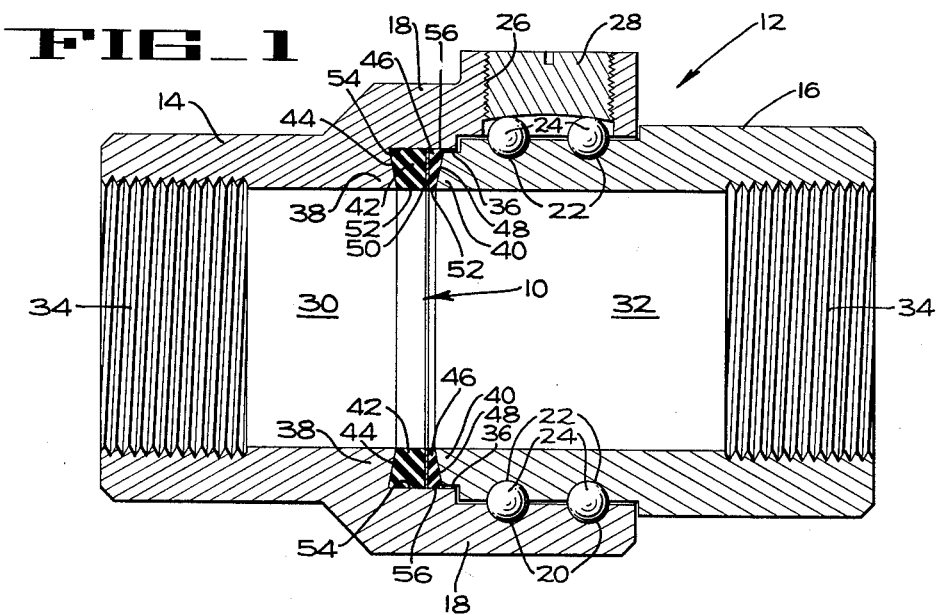
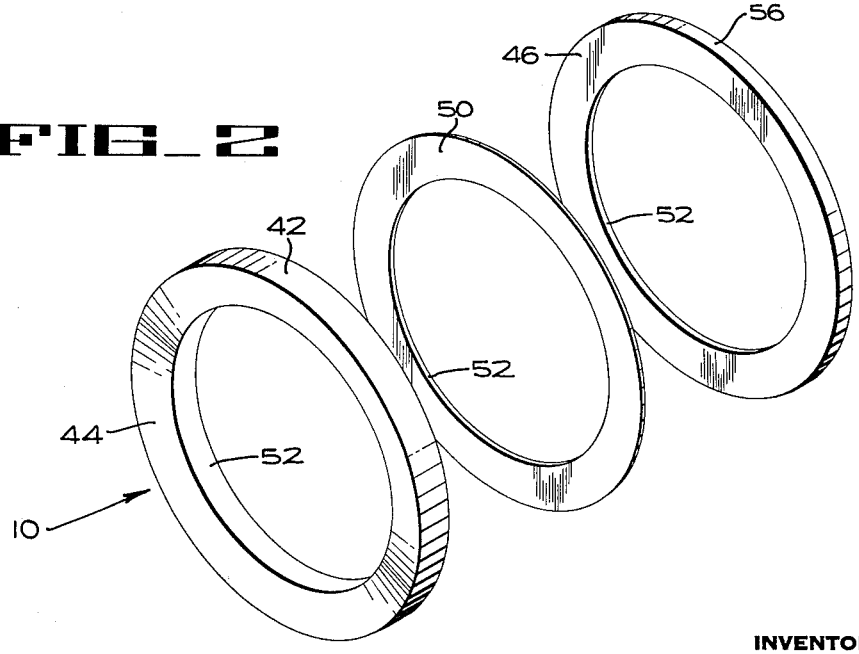
INVENTOR
HENRY W. ROESSLER, JR.
BY *Hans G. Hoffmeister*
ATTORNEY

United States Patent Office 3,156,476
Patented Nov. 10, 1964

3,156,476
PACKING FOR SWIVEL JOINTS
Henry W. Roessler, Jr., Pomona, Calif., assignor, by mesne assignments, to FMC Corporation, San Jose, Calif., a corporation of Delaware
Filed Nov. 18, 1960, Ser. No. 29,840
3 Claims. (Cl. 277—95)

The present invention pertains to pipe couplings and more particularly relates to the packings used in swivel pipe joints to provide a fluid-tight seal between the relatively rotatable elements of such couplings.

One of the objects of the present invention is to provide an improved packing member for a swivel pipe joint which effects an efficient seal and yet allows relative rotation of the two movable parts of the coupling with but a minimum of friction.

Another object of the invention is to provide a swivel pipe joint packing including at least two parts engaged with each other to maintain a fluid-tight seal therebetween, each part of the packing being arranged for rotation with the section of the swivel pipe joint in which it is installed so that a sliding seal is effected between the two parts of the packing instead of between the packing and the swivel section.

Another object is to provide a compound swivel joint packing provided with means for minimizing friction and wear between the relatively movable parts of the packing.

Another object of the present invention is to provide an improved compound packing for a swivel joint, which is of simplified, inexpensive construction and in which any tendency toward galling is minimized.

These and other objects and advantages of the present invention will become apparent from the following description and the accompanying drawing, in which:

FIGURE 1 is a longitudinal section taken through a swivel joint incorporating the improved packing member of the present invention.

FIGURE 2 is an exploded isometric illustrating the compound packing member of this invention.

The compound packing member 10 of the present invention is disposed in a swivel joint 12 (FIG. 1) comprising a female coupling member 14 and a male coupling member 16. A bell end 18 of the female coupling member 14 is provided with two internal ball races 20 and the male coupling member 16 is provided with two outwardly opening ball races 22. In the assembled swivel joint 12, the ball races 22 are aligned with the races 20 and ball bearings 24 are engaged within the aligned races 20 and 22. A threaded access aperture 26 is provided in the bell end 18 to allow insertion of the bearings 24 into the aligned ball races 20, 22 during assembly of the swivel joint and a threaded plug 28 is screwed into the aperture 26 to retain the bearings. Thus, in the usual manner, axial movement between the male coupling member 16 and the female coupling member 14 is limited by the bearings 24 while the bearings permit free rotation and prevent axial misalignment of the two parts of the coupling.

Aligned bores 30 and 32, preferably of the same diameter, are provided in the female coupling member 14 and in the male coupling member 16, respectively, which each terminate in threaded portions 34 provided for the purpose of engaging threaded pipes, not shown.

An annular recess 36 in the bell end 18 is of smaller diameter than the inside diameter of the bell end and is defined by a shoulder 38 that is inclined inwardly toward the male coupling 16. The male coupling 16 is provided with a beveled inner end that forms a shoulder 40 which is oppositely inclined to the shoulder 38 and is spaced therefrom a distance sufficient to permit the packing 10 to be received between the shoulders 38 and 40.

The compound packing member 10 (FIGS. 1 and 2) of the present invention includes a resilient annulus 42 having an inclined end wall 44 corresponding in its inclination to the shoulder 38 (FIG. 1) upon which it is seated in the assembled swivel joint. A second resilient annulus 46 (FIGS. 1 and 2) of the same inside and outside diameters as the annulus 42, is provided with an inclined end wall 48 (FIG. 1) that is seated upon the beveled end of the coupling member 16 which forms the shoulder 40. Between the annuli 42 and 46 is disposed a flat anti-friction ring 50 which may be formed of metal or any suitable plastic, such as Teflon, having a lower coefficient of friction in respect to the annuli 42 and 46 than the annuli 42 and 46 have in relation to each other. Additionally, both annuli 42 and 46 have a lower resistance to rotation relative to the ring 50 than in relation to the surfaces of the coupling members upon which they are seated. The outside diameters of the annuli 42 and 46, as well as that of the anti-friction ring 50, are of a size to be received within the annular recess 36 and the diameters of their apertures 52 correspond to the diameters of the bores 30 and 32.

When the swivel joint 12 is in communication with a source of pressurized fluid, hydrostatic pressure is exerted against the inner surfaces of the annuli 42, 46 and 50 of the packing ring 10, causing the resilient annuli 42 and 46 to be expanded radially outward into intimate sealing engagement against a circumferential wall 54 of the annular recess 36. At the same time, the radial deformation of the annuli 42 and 46 causes them to expand axially, i.e., laterally into intimate sealing engagement with the shoulder 38, the beveled end 40 of the male coupling member 16 and the anti-friction ring 50 disposed between the annuli.

However, it will be apparent that the annulus 42 is in more firm frictional engagement with the female coupling member 14 than with the anti-friction ring 50 due to its greater area of contact with the coupling member 14 and because the coupling member 14 has a higher coefficient of friction in relation to the annulus 42 than the annulus 42 has with the ring 50. In like manner, the annulus 46 is in more firm frictional engagement with the male coupling member 16 than with the anti-friction ring 50. In this regard, it should be explained that the surface of the shoulder 38 and the end 40 of the coupling member 16 need not be as smoothly machined as is the usual case. Instead, it is desirable that these surfaces be somewhat less smooth than the surfaces of the anti-friction ring 50 to additionally ensure that the annuli 42 and 46 will adhere to, and rotate with, their respectively associated coupling members of the swivel joint 12.

Therefore, in a swivel joint employing the fluid seal 10 of the present invention, the area wherein slippage occurs when one coupling member turns relatively to the other is restricted to the two faces of the anti-friction ring 50 except for a comparatively small area 56 of the outer circumferential surface of the annulus 46. Because the anti-friction ring 50 has a lower coefficient of friction relative to the annuli 42 and 46 than the annuli have in respect to their couplings, each annulus rotates in a sliding engagement against the ring 50 while a fluid tight seal is maintained therebetween.

It will be noted that the area 52 of the sealing annulus 46 which is subjected to hydrostatic pressure within the swivel joint 12 is relatively small. Therefore the amount of radial deformation which forces the periphery 56 of the annulus 46 against the circumferential wall 54 of the recess 36 is held at a low value; low enough to insure that the frictional engagement of the wall 48 of the annulus 46 with the beveled end 40 will be high enough to positively turn the annulus 46 with the male coupling member 16. An additional advantage deriving from the relatively slight radial deformation of the annulus 46 is that galling of the outer surface 56 of the annulus 46 is minimized.

From the foregoing description it will be seen that the present invention provides an improved swivel joint packing member 10 of very simple inexpensive construction which minimizes friction between the relatively rotatable sections of the swivel joint in which the packing is installed and thus makes it possible to turn one section of the swivel joint relatively to the other with minimal torque.

While a particular embodiment of the present invention has been shown and described it will be understood that the swivel joint packing is capable of modification and variation without departing from the principles of the invention and that the scope of the invention should be limited only by the scope and proper interpretation of the claims appended hereto.

The invention having been thus described that which is believed to be new and for which protection by Letters Patent is desired is:

1. A swivel pipe joint and seal construction comprising a female swivel coupling member provided with a bore and a counterbore defined by a circumferential wall and an annular shoulder, a male swivel coupling member rotatably mounted in said female coupling member and having an inner end surface confronting said annular shoulder of said counterbore, a compound packing disposed within said female coupling member for sealing between said relatively rotatable male and female coupling members, said packing comprising a first sealing annulus having an end surface engaged with said annular shoulder of the counterbore in the female coupling member, a second sealing annulus disposed adjacent said first sealing annulus and having an end surface engaged with said end surface of the male coupling member, the circumferential surfaces of both of said annuli being engaged with said circumferential wall of the counterbore in the female swivel coupling member, the circumferential areas of the two annuli being unequal, and an anti-friction ring interposed between said annuli which has a lesser coefficient of friction in respect to either of said sealing annuli than the coefficient of friction of either of said annuli with respect to its associated coupling member, whereby relative rotation between said male and female coupling members causes relative rotation between at least one of said sealing annuli and said anti-friction ring.

2. A swivel joint and seal construction comprising a female swivel coupling member provided with a bore and a counterbore partly defined by an annular shoulder, a male swivel coupling member rotatably mounted in said female coupling member and having an inner end surface confronting said annular shoulder of said counterbore, a compound packing for sealing between said relatively rotatable male and female coupling members comprising a first sealing annulus in peripheral and in end surface engagement with only the female one of said coupling members of said swivel joint, a second sealing annulus in peripheral engagement with said female coupling member and in end surface engagement with said male coupling member, the area of said end surface engagement of said second sealing annulus with said male coupling member being greater than the area of its peripheral engagement with said female coupling member, so that relative rotation between said male and female coupling members causes rotation of one of said sealing annuli with respect to the other, and an anti-friction annulus interposed between said sealing annuli.

3. A swivel pipe joint and seal construction comprising a female swivel coupling member provided with a bore and a counterbore defined in part by an annular shoulder, a male swivel coupling member rotatably mounted in said female coupling member and having an inner end surface confronting said annular shoulder of said counterbore, a compound packing for sealing between said relatively rotatable male and female coupling members comprising a first sealing annulus in sealing engagement with only one of said coupling members, a second sealing annulus in sealing engagement with both of said coupling members, the area of peripheral contact between said second sealing annulus and said one coupling member being less than the area of its end surface contact with the other of said coupling members, whereby relative rotation between said male and female coupling members causes rotation of one of said sealing annuli with respect to the other, and an annular member interposed between said sealing annuli, said annular member having a smaller coefficient of friction with respect to said sealing annuli than the coefficient of friction of the sealing annuli with respect to said male and female coupling members.

References Cited in the file of this patent

UNITED STATES PATENTS

| | | |
|---|---|---|
| 1,505,431 | Rollins | Aug. 19, 1924 |
| 2,153,825 | Difazio | Apr. 11, 1939 |
| 2,352,343 | Reynolds | June 26, 1944 |
| 2,509,118 | Warren | Mar. 23, 1950 |

FOREIGN PATENTS

| | | |
|---|---|---|
| 626,968 | Great Britain | July 25, 1949 |
| 534,767 | Canada | Dec. 25, 1956 |